United States Patent
Pang

(10) Patent No.: US 10,848,903 B2
(45) Date of Patent: Nov. 24, 2020

(54) DETERMINING TIMING FOR DETERMINATION OF APPLICABLE GEO-FENCES

(71) Applicant: Advanced New Technologies Co., Ltd., George Town (KY)

(72) Inventor: Lei Pang, Beijing (CN)

(73) Assignee: Advanced New Technologies Co., Ltd. (KY)

( * ) Notice: Subject to any disclaimer, the term of this patent is extended or adjusted under 35 U.S.C. 154(b) by 0 days.

(21) Appl. No.: 14/958,832

(22) Filed: Dec. 3, 2015

(65) Prior Publication Data

US 2016/0165393 A1 Jun. 9, 2016

(30) Foreign Application Priority Data

Dec. 8, 2014 (CN) .......................... 2014 1 0743794

(51) Int. Cl.
*H04W 24/00* (2009.01)
*H04W 4/021* (2018.01)
*H04W 4/02* (2018.01)
*H04W 4/20* (2018.01)
*H04L 29/06* (2006.01)

(52) U.S. Cl.
CPC .......... *H04W 4/021* (2013.01); *H04W 4/025* (2013.01); *H04L 69/28* (2013.01); *H04W 4/20* (2013.01)

(58) Field of Classification Search
CPC ....... H04W 4/02; H04W 64/00; H04W 4/021; H04W 4/025; H04W 4/20; H04L 69/28
USPC ...................................... 455/456.3
See application file for complete search history.

(56) References Cited

U.S. PATENT DOCUMENTS

| | | | |
|---|---|---|---|
| 6,480,147 B2 | 11/2002 | Durst et al. |
| 7,487,056 B2 | 2/2009 | Tashev |
| 8,170,586 B2 | 5/2012 | Yasuhara |
| 8,838,477 B2 | 9/2014 | Moshfeghi |
| 8,941,489 B2 | 1/2015 | Sheshadri |
| 2003/0198346 A1 | 10/2003 | Meifu |
| 2009/0088184 A1 | 4/2009 | Yasuhara |

(Continued)

FOREIGN PATENT DOCUMENTS

| | | |
|---|---|---|
| CN | 103826199 A | 5/2014 |
| CN | 103842845 A | 6/2014 |

(Continued)

*Primary Examiner* — Huy C Ho
(74) *Attorney, Agent, or Firm* — Van Pelt, Yi & James LLP

(57) ABSTRACT

Embodiments of the present application relate to a method and apparatus for determining positioning of a device in connection with a geo-fence. The method includes obtaining fence information associated with a plurality of geo-fences from a local storage, determining whether to perform geo-fence determination, and in the event that geo-fence determination is determined to be performed, sequentially determining whether the mobile device is currently located within one of the plurality of geo-fences, wherein a sequence according to which the sequential determination is performed is based at least in part on distances between corresponding ones of at least two of the plurality of geo-fences and a current location of the mobile device, and determining, based at least in part on a location of a geo-fence among the at least two of the plurality of geo-fences that is currently nearest to the mobile device, a determination time for a next geo-fence determination.

26 Claims, 5 Drawing Sheets

(56) References Cited

U.S. PATENT DOCUMENTS

| | | |
|---|---|---|
| 2009/0309789 A1 | 12/2009 | Verechtchiagine |
| 2010/0127919 A1 | 5/2010 | Curran et al. |
| 2010/0203901 A1 | 8/2010 | Dinoff et al. |
| 2011/0178811 A1 | 7/2011 | Sheridan |
| 2011/0178979 A1 | 7/2011 | Nakagawa et al. |
| 2012/0309409 A1 | 12/2012 | Grosman et al. |
| 2013/0103307 A1 | 4/2013 | Sartipi et al. |
| 2013/0217411 A1* | 8/2013 | Croy .................... H04W 4/021 455/456.1 |
| 2013/0225196 A1 | 8/2013 | James et al. |
| 2013/0326137 A1* | 12/2013 | Bilange ............... G06F 12/0866 711/113 |
| 2013/0331127 A1 | 12/2013 | Sabatelli et al. |
| 2014/0066090 A1 | 3/2014 | Henderson |
| 2014/0120943 A1 | 5/2014 | Shima |
| 2014/0248910 A1 | 9/2014 | Dave et al. |
| 2014/0274117 A1* | 9/2014 | Carmel .................. H04L 67/18 455/456.1 |
| 2014/0351411 A1 | 11/2014 | Wood et al. |
| 2016/0212583 A9* | 7/2016 | Croy .................... H04W 4/021 |

FOREIGN PATENT DOCUMENTS

| | | |
|---|---|---|
| CN | 103916818 A | 7/2014 |
| JP | 2004241876 A | 8/2004 |
| WO | 0137601 A1 | 5/2001 |
| WO | 2013106870 A1 | 7/2013 |

* cited by examiner

DETERMINING TIMING FOR DETERMINATION OF APPLICABLE GEO-FENCES

CROSS REFERENCE TO OTHER APPLICATIONS

This application claims priority to People's Republic of China Patent Application No. 201410743794.0 entitled A GEO-FENCE-BASED POSITIONING METHOD AND DEVICE, filed Dec. 8, 2014 which is incorporated herein by reference for all purposes.

FIELD OF THE INVENTION

The present application involves the field of internet data processing technology; in particular, the present application relates to a method and device for a geo-fencing-based positioning.

BACKGROUND OF THE INVENTION

With the increasing popularity of the mobile internet, a growing number of applications that use a current location of a user are being developed. For example, Alipay Wallet offers a geo-fence function such that corresponding prompts or responses are produced and presented to the user when the user enters a designated area (e.g., when the mobile device using Alipay Wallet is located within the designated area). Geo-fencing is a new application of LBS (Location Based Service) that uses a virtual fence to enclose a virtual geographical boundary. In the event that a mobile device enters or leaves a certain specified geographical area, the mobile device can receive automatic notices and alerts related to the certain specified geographical area.

In some related art, a server associated with a web service or other application running on a mobile device or other client can synchronize the fence information in the vicinity of a certain geographical location to the mobile device, and the mobile device or other client can determine whether it has entered a certain specified geographical area corresponding to the fence information. Typically, the determining of whether the mobile device or other client has entered the specified geographical area is performed at fixed time intervals.

However, when geo-fence determination is performed, if the fixed time intervals are spaced too far apart, such determination leads to untimely and inaccurate determination results. Conversely, if such fixed time intervals are spaced too closely together, the mobile device or other client performs positioning frequently, thereby increasing the amount of traffic and energy consumed. Therefore, there is a need for a method, device, and system for providing more effective enforcement of a geo-fence or determinations of whether a mobile device or other client has entered a specified geographical area associated with a geo-fence.

BRIEF DESCRIPTION OF THE DRAWINGS

Various embodiments of the invention are disclosed in the following detailed description and the accompanying drawings.

In order to describe more clearly the technical schemes in the embodiments of the present application, the drawings needed to describe embodiments are explained briefly below. Obviously, the drawings described below are only some embodiments of the present application. A person with ordinary skill in the art could, without expending inventive effort, acquire other drawings on the basis of these drawings.

DETAILED DESCRIPTION

Figure 1:
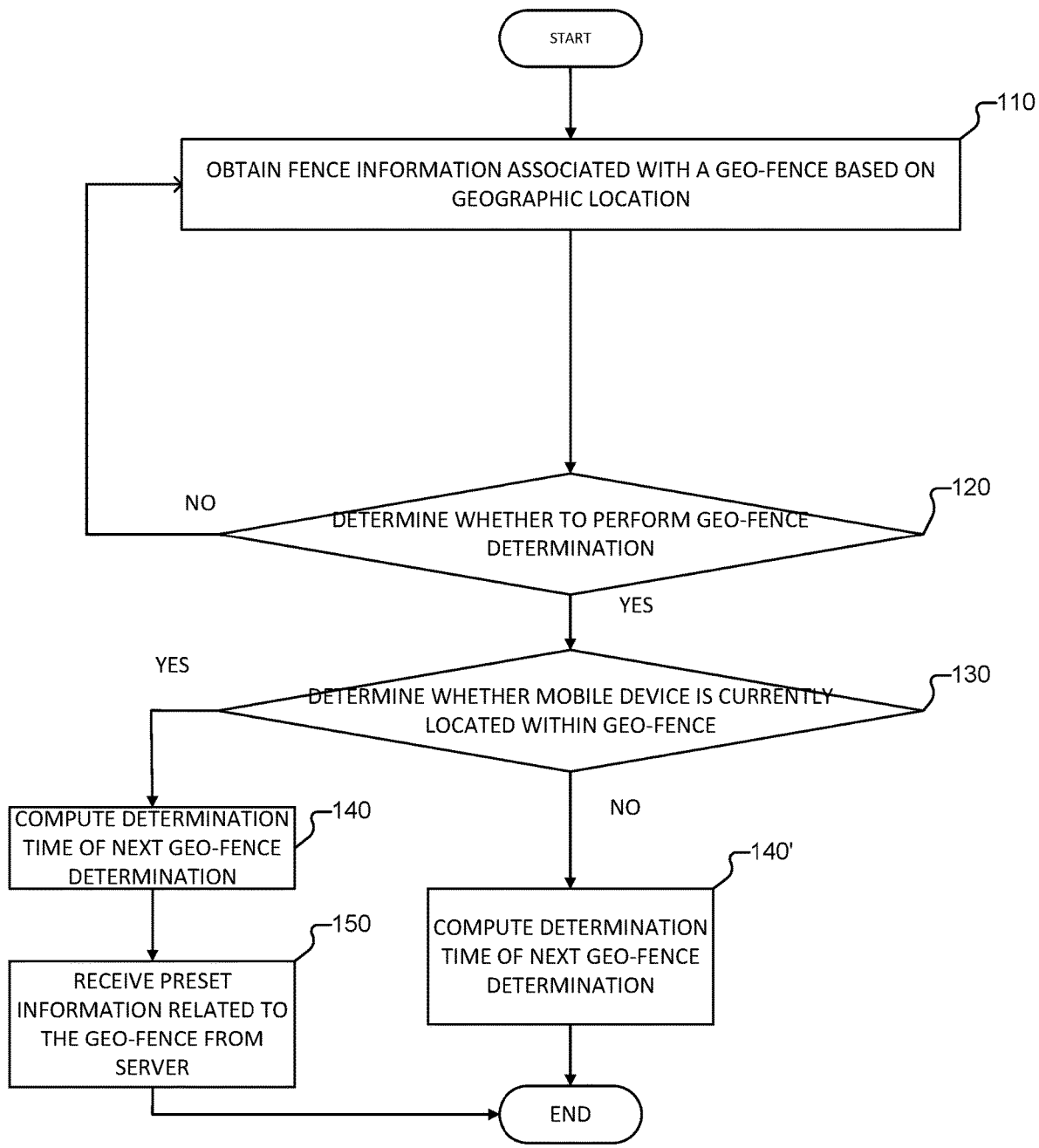
FIG. 1 is a flow chart of a method for determining positioning in connection with a geo-fence according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The technical schemes in the embodiments of the present application will be clearly and completely described in light of the drawings in specific embodiments of the present application. Obviously, the described embodiments are merely a part of the embodiments of the present application and not all the embodiments. All other embodiments obtained on the basis of the embodiments of the present application by persons with ordinary skill in the art shall fall within the scope of protection of the present application so long as no inventive effort is made in the course of obtaining them.

The present application can be used in many general-purpose or specialized computing device environments or configurations. For example: personal computers, server computers, handheld equipment or portable equipment, tablet equipment, multiprocessor devices, distributed computing environments comprising any of the above devices or equipment, etc.

The present application can be described in the general context of computer executable commands executed by a computer, such as a program module. Generally, program modules include routines, programs, objects, components, data structures, etc. to execute specific tasks or achieve specific abstract data types. The present application can also be carried out in distributed computing environments; in such distributed computing environments, tasks are executed by remote processing equipment connected via communication networks. In distributed computing environments, program modules can be located in local and remote computer storage media, including storage equipment.

FIG. 1 is a flow chart of a method for determining positioning in connection with a geo-fence according to various embodiments of the present application.

Referring to FIG. 1, process 100 for determining positioning in connection with a geo-fence is provided. Process 100 can be implemented by device 300 of FIG. 3, system 400 of FIG. 4, or computer system 500 of FIG. 5.

At 110, one or more information of a geo-fence is obtained. For example, fence information associated with a geo-fence is obtained. The fence information can include address fence information, which is a geographic information collection that contains a description of the geo-fence. For example, the fence information can include latitude information and a longitude information of the geo-fence. If the geo-fence is a circular fence, then the fence information can include latitude information and longitude information associated with the center is of the circular geo-fence, and a radius of the geo-fence. In the event that the geo fence is a polygon-shaped geo-fence, the fence information can include information associated with the vertices of the polygon geo-fence. For example, the fence information can include latitude information and longitude information of the vertices of the polygon-shaped geo-fence. In some embodiments, the fence information, or a portion thereof, is provided in a WTK format. In some embodiments, the fence information includes an identifier (ID) that is associated with a specific geographic area (e.g., according to a mapping of identifiers to geographic area). For example, the identifier can be mapped to a street, a road, a shopping district name (e.g., Huanglong), or the like. In some embodiments, a mobile device (e.g., device 300 of FIG. 3) obtains the fence information from a local storage. For example, the mobile device (e.g., device 300 of FIG. 3) can receive the fence information from a server and store such fence information locally on the mobile device. The server can correspond to a server that hosts a web service accessed by the mobile device, a server associated with (and in communication with) an application running on a mobile device, or the like. In some embodiments, the server can enforce a geo-fence in relation to the mobile device. For example, the server can provide various information or otherwise restrict information communicated (or made available) to the mobile device based on the location of the mobile device (in relation to a geographic area associated with a geo-fence). The fence information can be stored locally on the mobile device. For example, an enterprise can configure the mobile device with the fence information, or the mobile device can store the fence information in response to receiving the fence information from the server. In some embodiments, the fence information corresponding to a plurality of geo-fences is obtained. The fence information associated with the geo-fence can be obtained based at least in part on the geographic location of the mobile device.

The mobile device (or other client) can retrieve information on one or more geo-fences (e.g., the corresponding fence information) before performing 130 and 140 of process 100 of FIG. 1. In some embodiments, before performing geo-fence determination, the mobile device (or other client) first retrieves information on one or more geo-fences (e.g., the corresponding fence information). The information on the one or more geo-fences can include corresponding location information for the one or more geo-fences. The mobile device can obtain a geographic information collection for each of the one or more geo-fences.

In some embodiments, before performing geo-fence determination, the mobile device (or other client) first retrieves information on one or more geo-fences stored locally (e.g., the fence information), the locations of the one or more geo-fences are all related to the current geographic location of the mobile device. For example, fence information associated with geo-fences within a threshold distance (e.g., five meters) of the location of the mobile device is obtained. The geo-fences associated with the fence information can be geo-fences that were sent to the mobile device previously during a synchronization with the server, or the geo-fences can be geo-fences obtained by the mobile device by other means, for example, geo-fence information input directly on the mobile device by a user.

Figure 2:
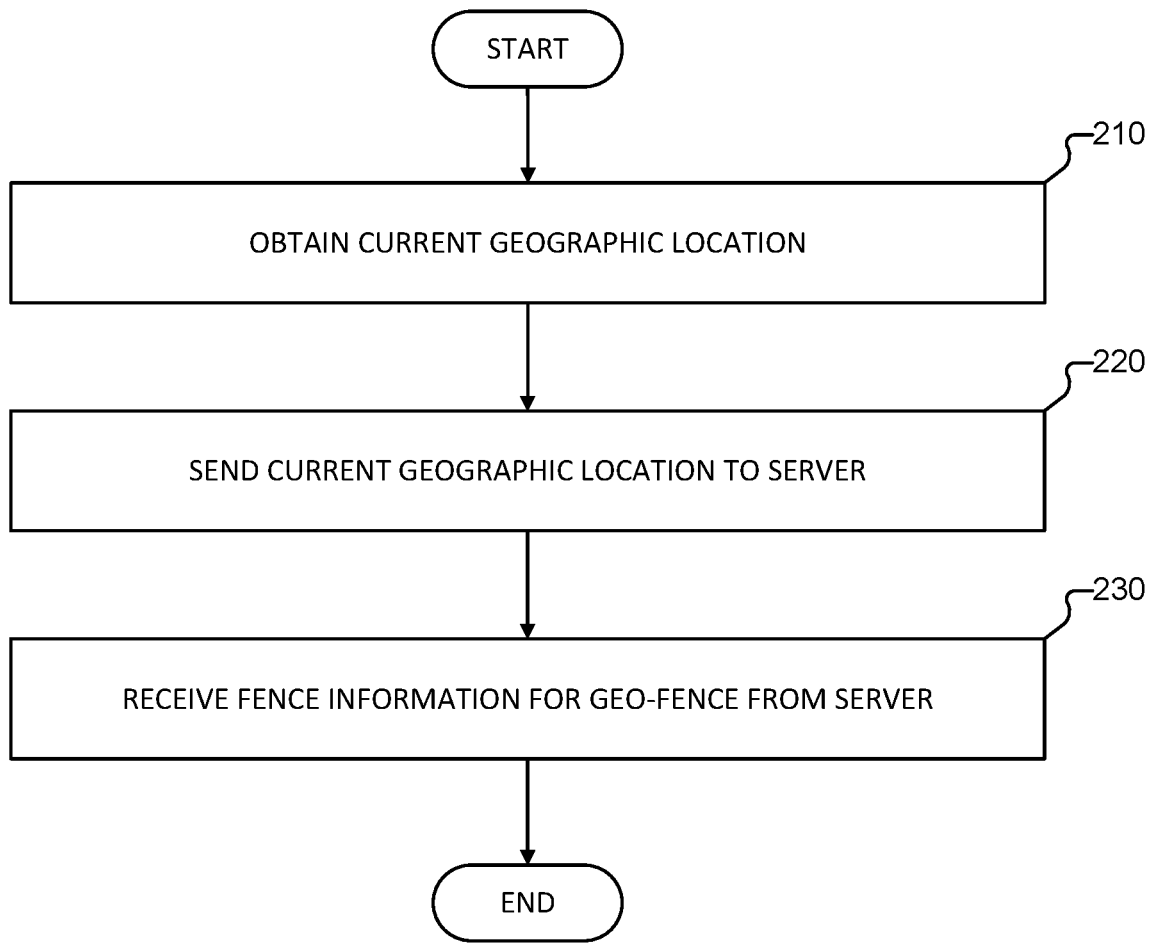
FIG. 2 is a flow chart of a method for receiving fence information in connection with a geo-fence according to various embodiments of the present application.

Specifically, when the mobile device downloads geo-fence information through the geo-fence synchronization process, the synchronization process between the mobile device and server may comprise process 200 of FIG. 2.

At 120, it is determined whether geo-fence determination is to be performed. In some embodiments, whether to perform geo-fence determination can be determined based on one or more of a location of the mobile device or time. Determining whether to perform geo-fence determination can comprise determining whether to trigger geo-fence determination at the current time. For example, determining whether to trigger geo-fence determination at the current time can include determining whether the current time is an opportune determination time to trigger geo-fence determination. The opportune determination time can correspond to a time at which the geo-fence determination is to be triggered according to an amount of time has passed since the last geo-fence determination vis a vis a threshold value (e.g., 30 minutes). In some embodiments, the geo-fence determination comprises determining whether the mobile device is within a geographical area corresponding to a geo-fence (e.g., a zone having borders defined by the geo-fence).

For example, with regard to the use of the location of the mobile device as a basis for determining whether to perform geo-fence determination, determining whether to perform geo-fence determination can comprise determining whether a current geographic location of the mobile device is a distance from the previous geographic location of the mobile device at which the geo-fence determination was performed that exceeds a threshold distance. The threshold distance can be configured by a user of the mobile device or an enterprise administrator associated with a network to which the mobile device connects. The threshold distance can be referred to as a preset migration threshold.

In some embodiments, in the event that the location of the mobile device is used as a basis for determining whether to perform geo-fence determination, a migration threshold value is retrieved. For example, the migration threshold can be set in advance on the mobile device and retrieved. The migration threshold value can correspond to a threshold that, when exceeded by the migration of the mobile device, geo-fence determination for the mobile device is triggered. The migration threshold value can be compared to a migration of the mobile device since a previous geo-fence determination. For example, if a value corresponding to a change in the location of the mobile device since the last time that the geo-fence determination was performed exceeds the migration threshold value, the geo-fence determination is triggered. The migration of the mobile device can be determined by a gravity sensor or other location or movement unit installed in the mobile device and associated operating system utilities such as a separate application that obtains a value of a real-time sensor interface system (e.g., from memory), or via a server connected to the network to which the mobile device is connected. As an example, if the migration threshold value is 1 km, when the gravity sensor detects that the migration generated by the mobile device exceeds 1 km, the geo-fence determination process is triggered for the mobile device. In some embodiments, the migration threshold value can be set to 0, such that the geo-fence determination process can be triggered when the status of the mobile device changes from stasis to movement (e.g., upon determining that the mobile device is moving).

In response to retrieving the migration threshold value, it is determined whether the mobile device has migrated such that the migration exceeds the migration threshold value.

In the event that it is determined that the migration of the mobile device exceeds the migration threshold value, the geo-fence determination is performed.

In some embodiments, with regard to the use of time as a basis for determining whether to perform geo-fence determination, determining whether to perform geo-fence determination can comprise determining whether an amount of time since the previous geo-fence determination exceeds a time threshold. For example, the determining of whether the current time is an opportune determination time to trigger geo-fence determination can use a dynamic time interval method.

The dynamic time interval method comprises retrieving the real-time determination time of the geo-fence determination most recently computed by the mobile terminal (e.g., obtaining the time at which the last geo-fence determination was performed).

In some embodiments, regardless of the method by which geo-fence determination is triggered, after each determination of whether the mobile device is located in an area corresponding to a certain geo-fence, the time interval for the next triggering of geo-fence determination can be computed.

In some embodiments, in the event that time is used as a basis for determining whether to perform geo-fence determination, a target determination time can be computed. The target determination time can correspond to the time at which the next geo-fence determination is to be performed. The process for computing the target determination time can comprise computing the initial distances between geo-fences currently received by the mobile device (e.g., one or more geo-fences corresponding to the current geographic location of the mobile device) and the location of the mobile device. In some embodiments, the geo-fences currently received by the mobile device can correspond to the one or more geo-fences for which corresponding fence information is stored locally at the mobile device.

In some embodiments, the mobile device computes all initial distances between the one or more geo-fences currently received from the server and the location (e.g., the current geographic location) of the mobile device. In some embodiments, when the target determination time is computed, because the mobile device may have migrated since the last time the target determination time was computed or the last time the geo-fence determination was performed, the distances between the geo-fences of the mobile device and the current geographic location of the mobile device is recalculated, and the nearest geo-fence to the current geographic location of the mobile device is re-determined.

In some embodiments, in the process of computing the distances between the geo-fences and the current geographic location of the mobile device, circular geo-fences are typically expressed using center point coordinates and a radius. The distance between the current geographic location of the mobile device and the center point of the corresponding circular geo-fence can be computed to serve as the initial distance. In some embodiments, for irregular polygonal geo-fences, the sum of the distances between the location of the mobile device and multiple locations along the polygon can be computed, and the average value of the distances between the location of the mobile device and multiple locations along the polygon can be computed to obtain the initial distance between the location of the mobile device and the corresponding polygon geo-fence.

In some embodiments, in response to computing the initial distances between the one or more geo-fences and the current geographic location of the mobile device, the smallest value from among such initial distances is selected and is divided by a preset speed threshold value to obtain a quotient result.

The smallest value is selected from among all of the initial distances, and this smallest value is divided by a preset speed threshold value (e.g., 2.7 meters/second) in order to obtain a quotient result in units of time. In some embodiments, the speed threshold value can be configured in advance on the mobile device by a user or an administrator associated with a network to which the mobile device connects, or the speed threshold value can be configured in advance on the server and sent to the mobile device. In some embodiments, the configuration of the speed threshold value can also be determined based on an empirical value (e.g., 5 km/h). For example, the speed threshold value can be computed and set based at least in part on the migration and time that have occurred previously on the mobile device. As an example, the standard for computation of the speed threshold value can be based at least in part on an average of historical migration and time values associated with the mobile device in connection with geo-fence determination.

In response to obtaining the quotient result according to the smallest value among the computed initial distances and the preset speed threshold, the quotient result is set to be the target determination time.

In the event that the real-time determination time of the geo-fence determination most recently computed by the mobile terminal is retrieved, it is determined whether the time difference between the current time and the time at which the geo-fence determination was last performed has reached the real-time determination time. In some embodiments, the real-time determination time corresponds to the target determination time. Accordingly, it is determined whether a time that has elapsed since the last time the geo-fence determination was performed is equal to or greater than the target determination time.

For example, assuming the target determination time is 10 minutes, it is determined whether the amount of time that has elapsed from the time when geo-fence determination was last performed to the current time has reached ten minutes.

In some embodiments, in the event that the time difference between the current time and the time at which the geo-fence determination was last performed has reached the real-time determination time, the geo-fence determination can be triggered. For example, process 100 can proceed from 120 to 130. In contrast, in the event that the time difference between the current time and the time at which the geo-fence determination was last performed has not reached the real-time determination time, process 100 can return to 110.

At 130, it is determined whether the mobile device is within a geo-fence. In some embodiments, in sequence according to the respective distance between at least one of the one or more geo-fences and the location of the mobile device, it is respectively determined whether the mobile terminal is currently located within a corresponding geo-fence. For example, for each particular geo-fence among the one or more geo-fences, it is determined whether the mobile device is currently located within the particular geo-fence.

In the event that the mobile device obtains fence information for a plurality of geo-fences (e.g., if the server returns multiple geo-fences to the mobile device), the distances between such geo-fences and the mobile device are likely to be different. Accordingly, the server can compute the respective distances between such geo-fences and the mobile device, and return an indication for the geo-fences to the mobile device, the indication indicating a sequence of the geo-fences from the nearest to the farthest. The geo-fences can be sorted by distance (e.g., in the sequence of geo-fences) because it is relatively easy to calculate the distance between the current position of the mobile terminal and the nearest go-fence, because the mobile terminal can provide the server with location information indicating a location (e.g., a latitude and a longitude) of the mobile terminal. In some embodiments, the server can return information for the geo-fences in an order corresponding to the sequence of the geo-fences from the nearest to the farthest relative to the current geographic location of the mobile device. In some embodiments, the server can send a list of the geo-fences that indicates the sequence of the geo-fences from the nearest to the farthest. In some embodiments, the server directly returns information associated with the geo-fences to the mobile device, and the client can compute the distances between such geo-fences and the current geographic location of the mobile device, and, after sorting them in sequence according to distance, can then trigger the determination for each geo-fence successively from the nearest to the farthest.

In some embodiments, determining whether the mobile device is located within a certain geo-fence comprises the mobile device computing all initial distances from the geo-fences for which information is received from the server to the current geographic location of the mobile device. For circular geo-fences, circular geo-fences are typically expressed using a center point and a radius; under ordinary circumstances, the distance d between the location of the mobile device and the center point can be computed first. If distance d is less than or equal to the radius of the geo-fence, the location of the mobile device can be deemed to be within the corresponding geo-fence. If distance d is greater than the radius of the geo-fence, the mobile device is deemed not to be within the corresponding geo-fence. However, in certain other circumstances, the location determined for the mobile device is not precise to a point. Accordingly, in some embodiments, the geographic location of the mobile device is represented by a smaller circle. Thus, in some embodiments, determining whether the mobile device is within the geo-fence comprises determining whether the small circle representing the current geographic location of the mobile device intersects with the circle of the geo-fence. For example, the distance between the two circle centers (e.g., the circle center of the geo-fence and the circle center of the small circle representing the current geographic location of the mobile device) can be calculated first, and if this distance is less than or equal to the sum of the radii of the two circles, then it is determined that the current geographic location of the mobile device is within this geo-fence. If the distance between the two circles is greater than the sum of the radii of the two circles, then it is determined that the current geographic location of the mobile device is outside the geo-fence.

In some instances, the geo-fence is an irregular polygon. Accordingly, determining whether the mobile device is currently located within the geo-fence can comprise building a closed polygon using, for example, a java.awt.Polygon object, and then, using the contains method (e.g., a function for determining whether a shape contains another object represented by, for example, coordinates or a range of coordinates) for this object to determine whether the current geographic location of the mobile terminal is within a polygonal geo-fence.

In the event that the mobile device is located within a certain geo-fence, then it can be determined that the location of the mobile device is within the area of this geo-fence, and if the mobile device is not located within a certain geo-fence, then it can be determined that the location of the mobile device is not within the area of this geo-fence.

At 140 the determination time for the next performance of geo-fence determination is computed. For example, in the event that the mobile device is determined to be currently located within the geo-fence at 130, process 100 proceeds to 140 and at 140, the determination time for the next performance of geo-fence determination is computed. As another example, in the event that the mobile device is determined to not be currently located within the geo-fence at 130, process 100 proceeds to 140' and at 140', the determination time for the next performance of geo-fence determination is computed. The time for next performance of geo-fence determination can be computed iteratively after each geo-fence determination. In some embodiments, the time for next performance of geo-fence determination is computed regardless of whether the mobile device is currently within the geo-fence.

In the event that the mobile device is determined to be currently located within the geo-fence, process 100 proceeds to 150 at which preset information related to the certain geo-fence is received from the server. For example, the preset information related to the certain geo-fence is pushed to the mobile device by the server. As an example, if the location of the mobile terminal is a fence address that corresponds to a geo-fence for the name address fence Huanglong business district, the mobile terminal will push, to the mobile terminal, business information such as Huanglong business district of food information, etc.

In some embodiments, if the mobile device is currently located within a certain geo-fence, the user of the mobile device can be deemed to have entered a business district associated with such a geo-fence. Accordingly, in some embodiments, preset information related to such a geo-fence can be pushed to the mobile device when the mobile device is located within the geo-fence. For example, the preset information can be communicated (e.g., pushed) to the mobile device upon determining that the mobile device is located within the geo-fence. A server can continue to communicate the preset information to the mobile device for as long as the mobile device is determined to be located within the geo-fence. In some embodiments, the preset information includes business discount information (e.g., current specials or sales), store information (e.g., location, contact information, services provided, offerings, etc.), and/ or the like.

In some embodiments, after performing the geo-fence determination, the determination time for the next performance of geo-fence determination is computed. The next determination time can be computed by computing the distance between the mobile device and the nearest geo-fence after the mobile device has been positioned. However, because the location of the mobile device can be changing (e.g., while the mobile device is moving), the geo-fence that is nearest to the mobile device also changes, and the distance between the mobile device and the nearest geo-fence is changing. Therefore, the target determination time computed after each performance of the geo-fence determination can be different. Various embodiments such as those that implement process 100 not only consider the speed at which the mobile device is moving, but also allow the interval between two geo-fence determination times to be variable, and therefore achieve better conformance to the movements of the mobile device. In the event that the mobile device moves relatively slowly, the target determination time for the next geo-fence determination is determined to be longer, thus conserving the power or traffic consumed by multiple repeated positioning of the mobile device, and also making the determination of geo-fences more timely and accurate for the mobile device.

FIG. 2 is a flow chart of a method for receiving fence information in connection with a geo-fence according to various embodiments of the present application.

Referring to FIG. 2, process 200 for receiving fence information in connection with a geo-fence is provided. Process 200 can be implemented by device 300 of FIG. 3, system 400 of FIG. 4, or computer system 500 of FIG. 5. Process 200 can be performed in conjunction with or independent of process 100. As an example, process 200 can be performed before 110 of FIG. 1. As another example, process 200 can be performed in parallel with process 100 at regular intervals, and fence information stored locally at the mobile device can be updated according to fence information received at 230.

At 210, a current geographic location of the mobile device is obtained. For example, the mobile device can obtain its current geographic location using a Geographic Positioning System (GPS) unit connected thereto or included therein. As another example, the mobile device can obtain its current geographic location based at least in part on one or more signal strengths to one or more networks, or on the network (e.g., the cell tower) to which the mobile device is connected. The geographic location can be determined locally at the mobile device or at a server connected to the network to which the mobile device is connected. Other processes or mechanisms for determining the current geographic location of the mobile device can be used. In some embodiments, the mobile device communicates its current geographic location in the form of geographic information. The geographic information can include latitude information and longitude information corresponding to the current geographic location of the mobile device.

At 220, in response to obtaining the current geographic location of the mobile device, the mobile device sends the current geographic location to a server such as, for example, a server that manages (or is otherwise associated with) one or more geo-fences.

At 230, fence information associated with a geo-fence is received. For example, the mobile device can receive, from a server that manages (or is otherwise associated with) one or more geo-fences, fence information for one or more geo-fences. The fence information for one or more geo-fences that is received from the server can be associated with one or more geo-fences within a specific threshold distance of the current geographic location of the mobile device. In some embodiments, in response to the server receiving the current geographic location of the mobile device, the server can query a database that stores mappings of geo-fences to locations respectively associated with the geo-fences (e.g., the geographic zone for which the geo-fence is associated) for the one or more geo-fences. In response to determining the one or more geo-fences corresponding to (e.g., within a threshold distance of) the current geographic location of the mobile terminal, the server can communicate the corresponding fence information to the mobile device. The specific threshold distance of the current geographic location of the mobile device for which the server communicates fence information can correspond to a synchronization radius in the area in which the current geographic location is located. The synchronization radius can be configured on the server in advance. For example, locations can be divided into different areas, with each area corresponding to a synchronization radius. In other embodiments, other methods can be used to configure the synchronization radius. For example, if the synchronization radius is 20 km, then the server searches for all geo-fences within 20 km from the current geographic location of the mobile device.

In some embodiments, the mobile device can report its current geographic location to the server at regular intervals, for example, once every 24 hours, thereby triggering a server-mobile device geo-fence synchronization process. For example, the mobile device can perform 210 and/or 220 at regular intervals.

Figure 3:
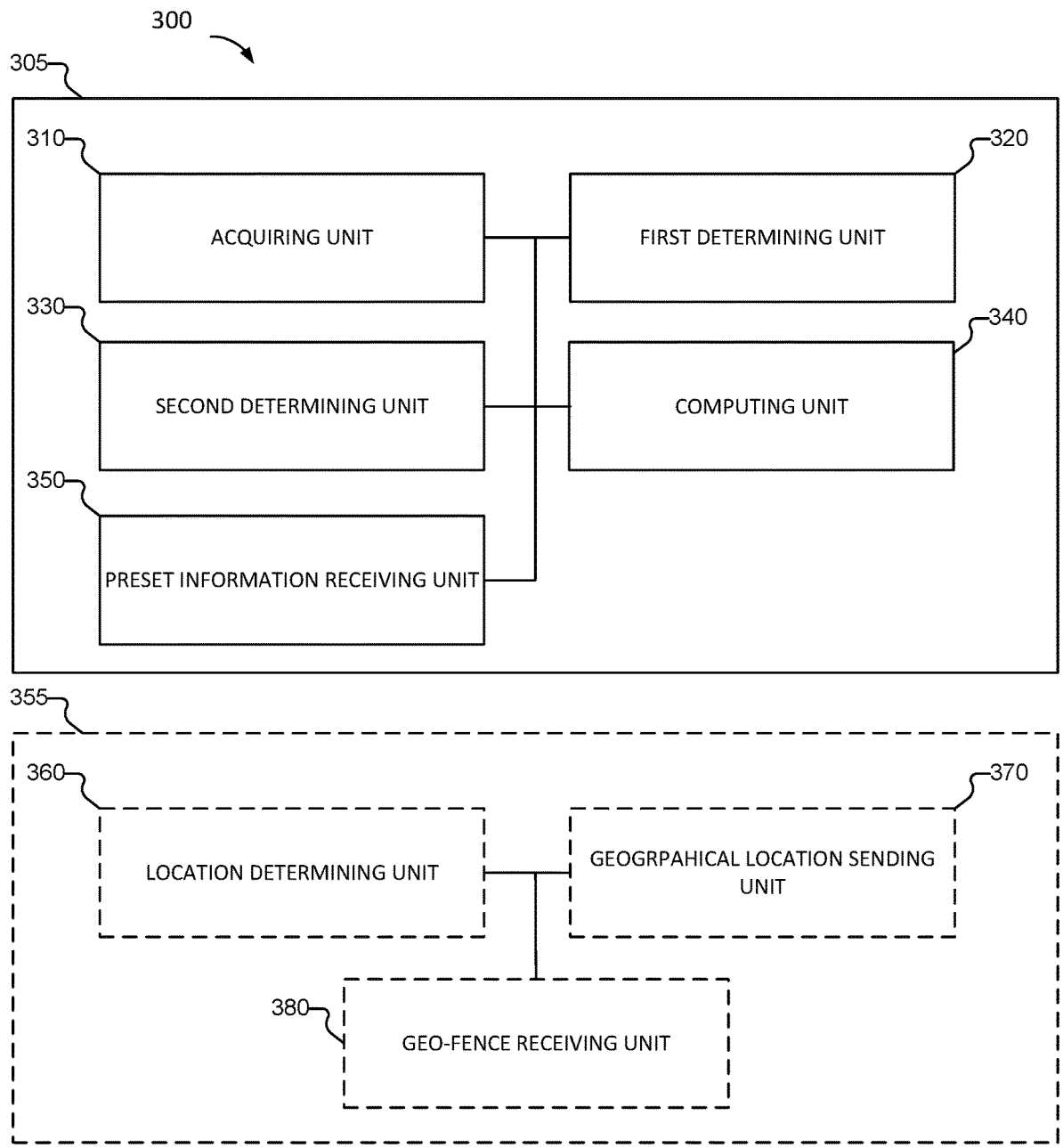
FIG. 3 is a block diagram of a device for determining positioning in connection with a geo-fence according to various embodiments of the present application.

FIG. 3 is a block diagram of a device for determining positioning in connection with a geo-fence according to various embodiments of the present application.

Referring to FIG. 3, device 300 for determining positioning in connection with a geo-fence is provided. Device 300 can implement process 100 of FIG. 1 and process 200 of FIG. 2. Device 300 can be implemented by system 400 of FIG. 4 or computer system 500 of FIG. 5. Device 300 can be a mobile device.

In some embodiments, device 300 comprises a geo-fence determining unit 305. The geo-fence determining unit 305 can comprise an acquiring unit 310, a first determining unit 320, a second determining unit 330, a computing unit 340, and a preset information receiving unit 350.

The acquiring unit 310 can be configured to obtain fence information associated with one or more geo-fences. The fence information associated with the one or more geo-fences can be stored locally on device 300. The acquiring unit 310 can implement 110 of process 100 of FIG. 1.

The first determining unit 320 is configured to determine whether to trigger (e.g., perform) geo-fence determination. The first determining unit 320 can determine whether to perform geo-fence determination based on one or more of a location of the mobile device or time. The first determining unit 320 can determine whether to trigger geo-fence determination at the current time. The first determining unit 320 can implement 120 of process 100 of FIG. 1.

In some embodiments, the first determining unit 320 comprises a time retrieving sub-unit configured to retrieve the real-time determination time of the geo-fence determination most recently computed by device 300. In some embodiments, the first determining unit 320 comprises a second determining sub-unit configured to determine if the time difference between the current time and the time of the last geo-fence determination performed has reached the real-time determination time.

In some embodiments, the first determining unit 320 comprises a migration retrieving sub-unit. The migration retrieving sub-unit is configured to retrieve the preset migration threshold value of device 300.

In some embodiments, the first determining unit 320 comprises a first determining sub-unit. The first determining sub-unit is configured to determine whether device 300 has currently generated migration that exceeds the preset migration threshold value.

The second determining unit 330 is configured to, when the result of the first determining unit indicates that geo-fence determination is to be performed, in sequence according to the distance between at least one geo-fence and the current geographic location of device 300, determine whether device 300 is currently located within a corresponding certain geo-fence. For example, for each particular geo-fence among the one or more geo-fences obtained by the acquiring unit 310, the second determining unit 330 determines whether device 300 is currently located within the particular geo-fence. The second determining unit 330 can implement at least a part of 130 of process 100 of FIG. 1.

The computing unit 340 is configured to compute the determination time for the next geo-fence determination based on the location of the geo-fence currently nearest to device 300. The computing unit 340 can implement 140 of process 100 of FIG. 1.

In some embodiments, the computing unit 340 comprises a first computing sub-unit configured to compute all initial distances between all geo-fences currently received by device 300 and the location of device 300.

In some embodiments, the computing unit 340 comprises a selecting sub-unit configured to select the smallest value from among all of the initial distances.

In some embodiments, the computing unit 340 comprises a second computing sub-unit configured to divide the smallest value by a preset speed threshold value to obtain a quotient result.

In some embodiments, the computing unit 340 comprises a determining sub-unit configured to determine the quotient result as the target determination time.

In some embodiments, device 300 optionally comprises geo-fence synchronization unit 355. The geo-fence synchronization unit 355 can implement process 200 of FIG. 2. The geo-fence synchronization unit 355 can comprise a location determining unit 360, a geographic location sending unit 370, and a geo-fence receiving unit 380.

The location determining unit 360 is configured to determine a current geographic location of device 300. For example, the location determining unit 360 can obtain the current geographic location of device 300 using a Geographic Positioning System (GPS) unit connected thereto or included therein. As another example, the location determining unit 360 can obtain the current geographic location of device 300 based at least in part on one or more signal strengths to one or more networks, or on the network (e.g., the cell tower) to which device 300 is connected. The geographic location can be determined locally at the location determining unit 360 or at a server connected to the network to which device 300 is connected. Other processes or mechanisms for determining the current geographic location of device 300 can be used. The location determining unit 360 can implement 210 of process 200 of FIG. 2.

The geographical location sending unit 370 is configured to send the current geographic location of device 300 to the server. The geographical location sending unit 370 can implement 220 of process 200 of FIG. 2.

The geo-fence receiving unit 380 is configured to receive fence information associated with a geo-fence. The fence information can be returned by the server based on the current geographical location of device 300. The geo-fence receiving unit 380 can implement 230 of process 200 of FIG. 2.

In some embodiments, the geo-fence determining unit 305 further comprises preset information receiving unit 350. The preset information receiving unit 350 is configured to receive preset information related to the certain geo-fence pushed by the server. The preset information receiving unit 350 is optionally included in the geo-fence determining unit 305.

In some embodiments, after performing the geo-fence determination, the determination time for the next performance of geo-fence determination is computed. The next determination time can be computed by computing the distance between the mobile device and the nearest geo-fence after the client has been positioned. However, because the location of the mobile device can be changing (e.g., while the mobile device is moving), the geo-fence that is nearest to the mobile device also changes, and the distance between the mobile device and the nearest geo-fence is changing. Therefore, the target determination time computed after each performance of the geo-fence determination can be different. Various embodiments not only consider the speed at which the mobile device is moving, but also allow the interval between two geo-fence determination times to be variable, and therefore achieve better conformance to the movements of the mobile device. In the event that the mobile device moves relatively slowly, the target determination time for the next geo-fence determination is determined to be longer, thus conserving the power or traffic consumed by multiple repeated positioning of the mobile device, and also making the determination of geo-fences more timely and accurate for the mobile device.

Figure 4:
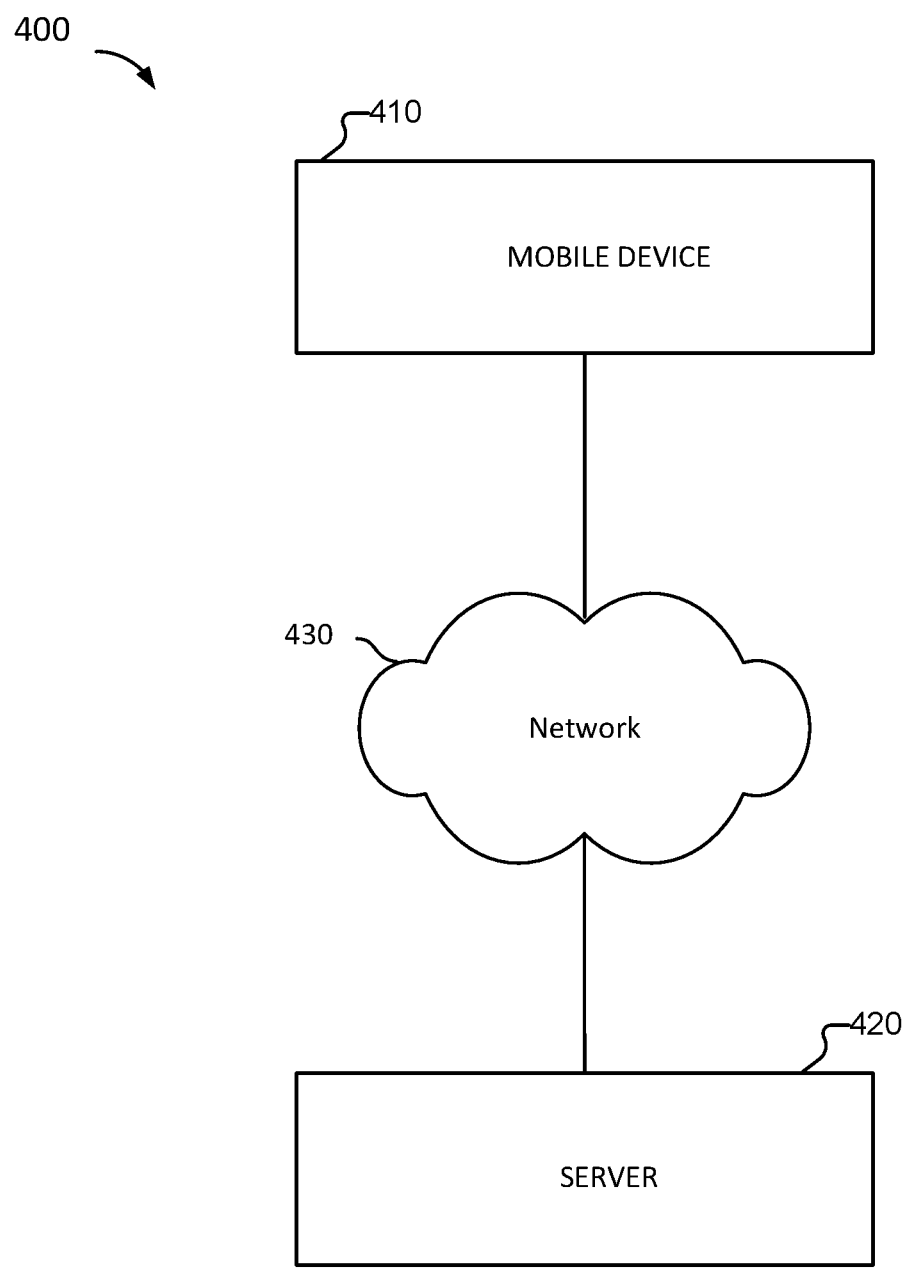
FIG. 4 is a diagram of a system for determining positioning in connection with a geo-fence according to various embodiments of the present application.

FIG. 4 is a diagram of a system for determining positioning in connection with a geo-fence according to various embodiments of the present application.

Referring to FIG. 4, system 400 for determining positioning in connection with a geo-fence is provided. System 400 can implement process 100 of FIG. 1 and process 200 of FIG. 2. System 400 can include device 300 of FIG. 3.

System 400 comprises mobile device 410, server 420, and network 430 over which mobile device 410 and server 420 communicate. Mobile device 410 can be implemented by device 300 of FIG. 3. In some embodiments, mobile device 410 and server 420 communicate to synchronize fence information associated with one or more geo-fences relevant to mobile device 410. The one or more geo-fences relevant to mobile device 410 can be determined based at least in part on a current geographic location of mobile device 410 (e.g., one or more geo-fences within a threshold distance of mobile device 410 can be deemed to be relevant to mobile device 410). Server 420 can store mappings of geo-fences to location information, mappings of geo-fences to fence information, and/or mappings of geo-fences to information about businesses or services available within the geo-fence. Server 420 can push information associated with the geo-fence to mobile device 410 in response to determining that mobile device 410 is within the geo-fence (or within a threshold distance of the geo-fence). The information pushed by server 420 to mobile device 410 can include business discount information (e.g., current specials or sales), store information (e.g., location, contact information, services provided, offerings, etc.), and/or the like.

The units (or sub-units) described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

Figure 5:
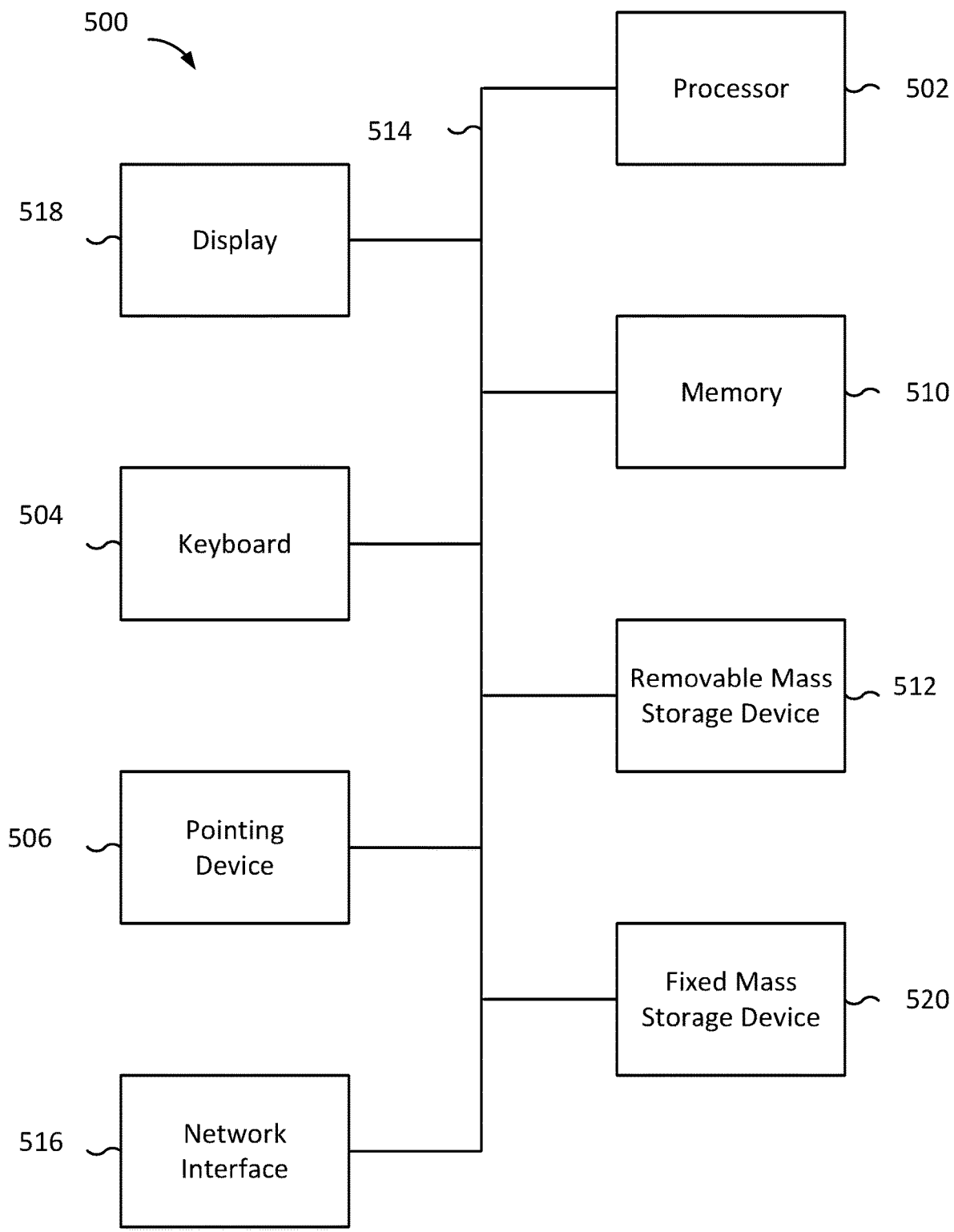
FIG. 5 is a functional diagram of a computer system for determining positioning in connection with a geo-fence according to various embodiments of the present application.

FIG. 5 is a functional diagram of a computer system for determining positioning in connection with a geo-fence according to various embodiments of the present application.

Referring to FIG. 5, a computer system 500 for determining positioning in connection with a geo-fence is shown. As will be apparent, other computer system architectures and configurations can be used to implement determining positioning in connection with a geo-fence. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown). The memory can be a non-transitory computer-readable storage medium.

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage device 512 and fixed mass storage 520 generally store additional programming instructions, data, and the like that typically are not in active use by the processor 502. It will be appreciated that the information retained within mass storage device 512 and fixed mass storage 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

Please note that persons with ordinary skill in the art may understand that all or part of the processes entailed in realizing the above-described embodiment methods can be accomplished by instructing appropriate hardware through computer programs. Said computer programs may be stored in computer-readable storage media. When the programs are executed, they may include the processes of the embodiments of the various methods described above. Said storage media may be magnetic disks, optical disks, read-only memory (ROM), and random-access memory (RAM).

It must be explained that each of the embodiments contained in the present application is described in a progressive manner, the explanation of each embodiment focuses on areas of difference from the other embodiments, and the descriptions thereof may be mutually referenced for portions of each embodiment that are identical or similar. In regard to device-type embodiments, because they are fundamentally similar to the method embodiments, their descriptions are relatively simple. Refer to partial explanations in the method embodiments where relevant.

Lastly, it must also be explained that, in this document, relational terms such as "first" or "second" are used only to differentiate between one entity or operation and another entity or operation, without necessitating or implying that there is any such actual relationship or sequence between these entities or operations. Furthermore, the terms "comprise" or "contain" or any of their variants are to be taken in their non-exclusive sense. Thus, processes, methods, objects, or equipment that comprises a series of elements not only comprises those elements, but also comprises other elements that have not been explicitly listed or elements that are intrinsic to such processes, methods, objects, or equipment. In the absence of further limitations, for an element that is limited by the phrase "comprises a(n) . . . ", the existence of additional identical elements in processes, methods, things, or equipment that comprises said elements is not excluded.

The geo-fencing-based positioning method and device offered in the present application have been described in detail above. This document has employed specific examples to describe the principles and implementation methods of the present application. The descriptions of the embodiments above are merely used to aid in the understanding of the method offered in the present application and its core ideas. At the same time, for persons with general skill in the art, based on the ideas of the present application, there are likely to be variations with respect to the specific implementation methods and scope of application; to summarize, the content of this description should not be understood to limit the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining, by a mobile device, fence information associated with a plurality of geo-fences from a local storage;
   determining whether to perform geo-fence determination; and
   in response to determining that geo-fence determination is to be performed,
      sequentially determining whether the mobile device is currently located within one of the plurality of geo-fences, wherein a sequence according to which the sequential determination is performed is based at least in part on distances between corresponding ones of at least two of the plurality of geo-fences and a current location of the mobile device; and
   determining a determination time for a next geo-fence determination;
   wherein:
      the determination time for the next geo-fence determination is based at least in part on a location of a geo-fence among the at least two of the plurality of geo-fences that are currently nearest to the mobile device;
      the location of the geo-fence used in connection with computing the determination time for the next geo-fence determination is based on a computed average of respective distances between the current location of the mobile device and a plurality of location points for the geo-fence;
      the determination time for the next geo-fence determination indicates when to determine whether the mobile device has entered a specific geographic area corresponding to one or more geo-fences;
      the determination time for the next geo-fence determination corresponds to a time at which the next geo-fence determination is to be performed or an amount of time that will have elapsed before the next geo-fence determination is to be performed.

2. The method of claim 1, further comprising:
   obtaining the current location of the mobile device;
   sending the current location of the mobile device to a server; and
   receiving, from the server, fence information associated with the plurality of geo-fences, wherein the fence information sent by the server is selected based at least in part on the current location of the mobile device.

3. The method of claim 2, wherein the server provides mobile device with an indication of an ordering of the plurality of geo-fences based on corresponding distances between the plurality of geo-fences and the mobile device, and the indication of the ordering of the plurality of geo-fences is provided to the mobile device in connection with the server providing the fence information associated with the plurality of geo-fences.

4. The method of claim 1, further comprising:
   in response to determining that the mobile device is located within one of the plurality of geo-fences, receiving preset information related to the one of the plurality of geo-fences, wherein the preset information is received by a server.

5. The method of claim 4, further comprising:
   determining whether the mobile device is located within one of the plurality of geo-fences.

6. The method of claim 4, wherein the preset information comprises information associated with one or more of a business within the geo-fence or a service available within the geo-fence.

7. The method of claim 6, wherein the preset information includes sale information associated with the business within the geo-fence.

8. The method claim 1, wherein the determining of the determination time for the next geo-fence determination comprises:
   computing respective initial distances between two or more of the plurality of geo-fences and the current location of the mobile device;
   selecting a smallest value from among the computed initial distances;

computing a quotient result based at least in part on dividing the selected smallest value by a preset speed threshold value; and determining a target determination time based at least in part on the computed quotient result.

9. The method of claim 1, wherein determining whether to perform geo-fence determination comprises:
retrieving a preset migration threshold value of the mobile device; and
determining whether an amount of migration of the mobile device is in excess of the preset migration threshold value.

10. The method of claim 1, wherein determining whether to perform geo-fence determination comprises:
retrieving a real-time determination time of the geo-fence determination computed by the mobile device; and
determining whether a time difference between a current time and a time at which geo-fence determination was most recently performed is equal to or greater than the real-time determination time.

11. The method of claim 1, wherein the determining whether to perform the geo-fence determination comprises:
determining to perform the geo-fence determination at an earlier of: a previous determination time for geo-fence determination has expired, or an amount of migration of the mobile device since a previous geo-fence determination is determined to be in excess of a preset migration threshold value.

12. The method of claim 1, wherein the determination time for the next geo-fence determination is independent from a previous determination time for geo-fence determination that is associated with the determining of whether to perform the geo-fence determination.

13. The method of claim 1, wherein the determination time for the next-geo-fence determination is determined based at least in part on a speed threshold and a distance between one or more of the plurality of geo-fences and the mobile device.

14. The method of claim 1, wherein the determination time for the next-geo-fence determination is determined based at least in part on distance between a current location of the mobile device and a location at which the geo-fence determination was last performed exceeds a preset migration threshold.

15. The method of claim 1, wherein the plurality of location points for the geo-fence that are used in connection with computing the determination time of the next geo-fence determination correspond to points along a perimeter of the geo-fence.

16. The method of claim 1, wherein the fence information for the plurality of geo-fences received from the server are associated with one or more geo-fences within a predefined threshold distance of the current location of the mobile device.

17. A device, comprising:
at least one processor configured to:
obtain, by a mobile device, fence information associated with a plurality of geo-fences from a local storage;
determine whether to perform geo-fence determination; and
in response to a determination that geo-fence determination is to be performed,
sequentially determine whether the mobile device is currently located within one of the plurality of geo-fences, wherein a sequence according to which the sequential determination is performed is based at least in part on distances between corresponding ones of at least two of the plurality of geo-fences and a current location of the mobile device; and
determine a determination time for a next geo-fence determination;
wherein:
the determination time for the next geo-fence determination is based at least in part on a location of a geo-fence among the at least two of the plurality of geo-fences that are currently nearest to the mobile device;
the location of the geo-fence used in connection with computing the determination time for the next geo-fence determination is based on a computed average of respective distances between the current location of the mobile device and a plurality of location points for the geo-fence;
the determination time for the next geo-fence determination indicates when to determine whether the mobile device has entered a specific geographic area corresponding to one or more geo-fences;
the determination time for the next geo-fence determination corresponds to a time at which the next geo-fence determination is to be performed or an amount of time that will have elapsed before the next geo-fence determination is to be performed; and
a memory coupled to the at least one processor and configured to provide the at least one processor with instructions.

18. The device of claim 17, wherein the at least one processor is further configured to:
obtain the current location of the mobile device;
send the current location of the mobile device to a server; and
receive, from the server, fence information associated with one or more of the plurality of geo-fences, wherein the fence information sent by the server is selected based at least in part on the current location of the mobile device.

19. The device of claim 17, wherein the at least one processor is further configured to:
in response to a determination that the mobile device is located within one of the plurality of geo-fences, receive preset information related to the one of the plurality of geo-fences, wherein the preset information is received by a server.

20. The device of claim 19, wherein the at least one processor is further configured to:
determine whether the mobile device is located within one of the plurality of geo-fences.

21. The device of claim 19, wherein the preset information comprises information associated with one or more of a business within the geo-fence or a service available within the geo-fence.

22. The device of claim 21, wherein the preset information includes sale information associated with the business within the geo-fence.

23. The device of claim 17, wherein the at least one processor is further configured to determine the determination time for the next geo-fence determination by:
computing respective initial distances between two or more of the plurality of geo-fences and the current location of the mobile device;

selecting a smallest value from among the computed initial distances;

computing a quotient result based at least in part on dividing the selected smallest value by a preset speed threshold value; and determining a target determination time based at least in part on the computed quotient result.

24. The device of claim 17, wherein the at least one processor is further configured to determine whether to perform geo-fence determination by:

retrieving a preset migration threshold value of the mobile device; and determining whether an amount of migration of the mobile device is in excess of the preset migration threshold value.

25. The device of claim 17, wherein the at least one processor is further configured to determine whether to perform geo-fence determination by:

retrieving a real-time determination time of the geo-fence determination computed by the mobile device; and determining whether a time difference between a current time and a time at which geo-fence determination was most recently performed is equal to or greater than the real-time determination time.

26. A computer program product, the computer program product being embodied in a non-transitory computer readable storage medium and comprising computer instructions for:

obtaining, by a mobile device, fence information associated with a plurality of geo-fences from a local storage;

determining whether to perform geo-fence determination; and in response to determining that geo-fence determination is to be performed, sequentially determining whether the mobile device is currently located within one of the plurality of geo-fences, wherein a sequence according to which the sequential determination is performed is based at least in part on distances between corresponding ones of at least two of the plurality of geo-fences and a current location of the mobile device; and determining a determination time for a next geo-fence determination;

wherein:

the determination time for the next geo-fence determination is based at least in part on a location of a geo-fence among the at least two of the plurality of geo-fences that are currently nearest to the mobile device;

the location of the geo-fence used in connection with computing the determination time for the next geo-fence determination is based on a computed average of respective distances between the current location of the mobile device and a plurality of location points for the geo-fence;

the determination time for the next geo-fence determination indicates when to determine whether the mobile device has entered a specific geographic area corresponding to one or more geo-fences;

the determination time for the next geo-fence determination corresponds to a time at which the next geo-fence determination is to be performed or an amount of time that will have elapsed before the next geo-fence determination is to be performed.

* * * * *